United States Patent Office 3,850,861
Patented Nov. 26, 1974

3,850,861
PREPARATION AND FORMULATION OF
POLYURETHANE FOAMS
Hubert J. Fabris and Robert J. Herold, Akron, and Edwin
M. Maxey, Kent, Ohio, assignors to The General Tire
& Rubber Company, Akron, Ohio
No Drawing. Filed Nov. 24, 1972, Ser. No. 309,234
Int. Cl. C08g 22/14
U.S. Cl. 260—2.5 BE                4 Claims

ABSTRACT OF THE DISCLOSURE

There is disclosed the preparation of flexible or rigid polyurethane foams of improved physical and chemical properties by the chemical reaction of (A) an organic polyisocyanate and (B) the copolymer of (a) a polymerizable organic vinyl monomer having either one double bond or two double bonds in conjugation to each other and (b) a hydroxyl-containing comonomer consisting essentially of an unsaturated polyalkylene ether macromonomer which has an equivalent weight of about 100 to 3000 and which contains one to three hydroxyl groups and one copolymerizable unsaturation per molecule.

BACKGROUND OF THE INVENTION

Polyurethanes have been defined as those polymers containing the characteristic urethane linkage,

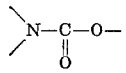

which can be considered a mixed amide ester of carbonic acid. The "urethane polymers" comprise not only homopolymers, but also copolymers wherein the urethane may be only one of many types of linkages in the polymer chain. Thus, a polyurethane may also be comprised of a wide variety of radicals and linkages including oxygen, sulfur, nitrogen, and carbon-containing groups such as amino, amido, sulfoamido, ester, ether, and hydrocarbon radicals and linkages.

It is well known that a polyurethane can be prepared by reacting an organic polyfunctional isocyanate with a suitable hydroxyl component, i.e., an organic compound having two or more reactive hydrogen atoms (as determined by the well-known Zerewitinoff determination) such as are found, for example, on a polyester, a polyester amide, a polyalkylene ether, a polyacetal or a polyalkylene thioether. When this reaction is conducted under anhydrous conditions, the resulting polyurethane may be nonporous.

If a cellular or foamed product is desired, water and at least an equivalent amount of isocyanate can be added to the mixture. When water reacts with the isocyanate groups not previously reacted, carbon dioxide is formed and is entrapped in the reaction mixture. An auxiliary blowing agent, such as a volatile fluorocarbon, may also be employed. The gelling time of the reaction mixture is commonly controlled preferably to be slightly longer than the rise time, so that the solidifying mass entraps therewith the carbon dioxide or other gas thereby giving a foamed product.

In the manufacture of polyurethane foams, the ability to hold load carrying capacity constant at a constant density and in many cases the ability to achieve maximum load carrying capacity at a given density are both very important, especially from an economic standpoint and from a quality control standpoint. A way of increasing load carrying capacity is to increase the polyisocyanate content although this is not too efficient. Furthermore, in factory production the use of a higher isocyanate index increases the potential danger of fire in green (not completely cured) foam storage areas.

In accordance with this invention, there is prepared a polyurethane foam of improved physical and chemical properties such as increased load supporting capacity, increased tensile strength, increased modulus of elasticity, and increased solvent resistance.

SUMMARY OF THE INVENTION

This invention comprises the preparation of a polyurethane of improved physical and chemical properties by the chemical reaction of (A) an organic polyisocyanate and
(B) the copolymer of
  (a) a polymerizable organic vinyl monomer having either one double bond or two double bonds in conjugation to each other and
  (b) a hydroxyl-containing comonomer consisting essentially of an unsaturated polyalkylene ether macromonomer which has an equivalent weight of about 100 to 3000 and which per hydroxyl group contains one to three hydroxyl groups and one copolymerizable unsaturation per molecule.

In one embodiment of this invention, there is prepared a flexible or rigid polyurethane foam having improved strength and solvent resistance.

In another embodiment of this invention there is prepared a flexible polyurethane foam having improved load supporting ability and load deflection characteristics compared to conventionally prepared flexible foams of equal density.

In still another embodiment of this invention there is prepared a rigid polyurethane foam having improved strength per volume ratio.

DESCRIPTION OF THE PREFERRED EMBODIMENTS

In the practice hereof it has been discovered that unique and valuable polyol resins can be obtained when vinyl monomers are copolymerized with a polyether containing one polymerizable carbon-carbon double bond and one to three hydroxyl groups per molecule.

The hydroxyl-carrying, unsaturated polyether (macromonomer) can be readily prepared by the homopolymerization or copolymerization of alkylene oxides of the general formula:

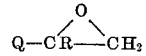

where R is hydrogen or an alkyl group of less than ten carbon atoms and Q is an alkyl or aryl group of less than ten carbon atoms or R'CH$_2$— where R' is an aryl, alkoxy or alkyl carboxy group of less than ten carbon atoms.

Typical alkylene oxides, include ethylene oxide, propylene oxide, butylene oxide, styrene oxide, and alkyl or aryl glycidyl ethers or esters polymerized with a catalyst, preferably a complex cyanide catalyst, e.g., Zn$_3$(Co(CN)$_6$)$_2$, in the presence of an appropriate unsaturated initiator. Such catalysts are shown in U.S. Pats. Nos. 3,427,256; 3,427,334; and 3,427,335.

The selected initiator is a compound containing one polymerizable unsaturated group and one to three active hydrogen atoms capable of initiating alkylene oxide polymerization in combination with the selected catalyst.

Examples of suitable initiators are: monobasic acids such as acrylic, methacrylic, crotonic, cinnamic and abietic acid and their hydroxy alkyl esters or amides; dibasic acids or their derivatives such as maleic, fumaric, citraconic, itaconic, mesaconic, chloromaleic, cyclohexene dicarboxylic, endomethylene cyclohexene dicarboxyic and chlorendic acid and their monoesters, monoamides and corresponding hydroxyalkyl derivatives; tribasic acids such as aconitic acid and its mono and diesters and amides and corresponding hydroxylalkyl derivatives; hydroxyalkyl or dihydroxyl alkyl vinyl ethers or unsaturated hydroxy-carrying compounds such as allyl, crotyl and methallyl alcohol, butanediol and its homologues; monoallyl, crotyl or methallyl ethers of dihydroxy or trihydroxy alkanes; hydroxy alkyl N-vinyl carbamates or N-vinyl-N'-hydroxy alkyl-urea and others.

The "macromonomers" obtained after addition of alkylene oxide to the initiator may have equivalent weights between 100 and 3000 per hydroxyl group.

The vinyl compounds used in combination with the above macromonomer can be any monomer or monomer blend which can be made to copolymerize with the macromonomer by a radical-mechanism under utilization of any of the techniques known to the art.

Examples for these vinyl monomers are: acrylonitrile, methacrylonitrile, vinyl acetate, vinyl chloride, vinylidenechloride, the low molecular weight acrylates and methacrylates, acrylamide, styrene and substituted styrenes, itaconates, butadiene, isoprene, vinyl pyridines, vinyl sulfonates, vinyl and allyl derivatives of the phosphorus acids and many others.

The copolymerization can be carried out either in bulk, preferably in the presence of sufficient chain transfer agent to prevent the formation of higher than desired molecular weights, or in solution.

Either peroxides or aliphatic diazo compounds can be used as initiators for the radical polymerization. The molecular weight of the copolymer as determined by any colligative method will generally be in the neighborhood of 500 to 7000 depending on the molecular weight of the macromonomer and the desired end product. Polymerization conditions (temperature, time, amount and type of chain transfer agent, etc.) will depend on the type of monomers utilized.

The copolymers are preferably viscous liquids (especially if they are to be used as the only polyol-component in urethane preparations without solvent) or solids which can be dissolved in commercial polyols or in solvents generally used in polyurethane coatings preparation. The charge ratio of macromonomer to vinyl monomer(s) (in moles) can be between 1:5 to 1:50 depending on the desired end product and the copolymerization behavior of the monomers. The copolymerization is preferably conducted such that the average functionality of the obtained resins is between 2 and 4 (when the intended end use is in flexible urethanes) or higher (e.g., 3 to 6) when resins for rigid materials are desired.

The average functionality is generally determined by the ratio of vinyl monomer to hydroxy carrying component and the molecular weight of the copolymer.

The copolymer resins of this invention can be used in all types of polyurethanes such as coatings, adhesives, cast elastomers, and rigid or flexible foams. They can be used either alone or blended with other isocyanate-reactive resins.

Any suitable organic polyisocyanate may be utilized in the process of this invention such as, for example, aliphatic polyisocyanates, aromatic polyisocyanates, alicyclic polyisocyanates and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluene diisocyanate, 2,6-toluene diisocyanate, 4,4'-diphenylmethane diisocyanate, 2,2-diphenylpropane- 4,4'-diisocyanate, p-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1 - chlorobenzene-2,4-diisocyanate, 4,4',4''-triisocyanato triphenylmethane, 1,3,5-triisocyanato benzene, 2,4,6-triisocyanato toluene, 4,4'-dimethyl diphenylmethane-2,2', 5,5'-tetraisocyanate, furfurylidene diisocyanate and the like. Of the various polyisocyanates which can be used, the toluene diisocyanates are preferred, particularly an isomeric mixture of 80% 2,4-toluene diisocyanate and 20% 2,6-toluene diisocyanate.

The following examples represent some of the best embodiments contemplated by the inventors in the practice of this invention. Unless otherwise stated, all quantitative measurements are by weight.

EXAMPLE I (A) Preparation of Unsaturated Polyether Glycol (Macromonomer)

A polypropylene ether glycol was prepared according to the procedure described in U.S. Pat. No. 3,654,224.

1,500 grams (g.) of propylene oxide, 2 g. of $Zn_3(CoCN_6)_2$-dimethoxy-ethane complex and 232 g. of maleic acid were charged to a closed reactor at 40° F. The temperature was gradually raised to 170° F. and stirring continued at this temperature until the original pressure within the reactor dropped to 5–10 p.s.i. At this point another 1500 g. of propylene oxide was added over a time period of two hours and stirring continued for three more hours. The polyethylene glycol, after removal of volatile materials at 200° F. in vacuo, had a hydroxyl number of 76.75 mg. KOH/g. corresponding to an average molecular weight of 1460. Attempts to initiate propylene oxide polymerization with the potassium salt of maleic acid were unsuccessful.

(B) Copolymerization With Vinyl Chloride 125 grams of the above polyether glycol, 25 g. of vinyl chloride, 0.5 g. azo-bisiobutyronitrile, 90 ml. benzene and 10 ml. carbontetrachloride were charged to a polymerization bottle and rotated in a constant temperature bath at 80° C. for 24 hours. Elimination of solvent and non-reacted monomer in a vacuum gave a homogeneous viscous, liquid with hydroxyl number 58.5 mg. KOH/g. and acid number 1.5 mg. KOH/g. corresponding to an average equivalent weight of 975.

(C) Polyurethane Films

Films were prepared from the original polyether and the copolymer according to the recipe:

0.01 gm.-equivalent polyetherpolyol based on hydroxyl
0.01 gm.-equivalent polyetherpolyol based on hydroxyl
0.2 gm. stannous octoate
0.02 gm. triethylene diamine (33 wt. percent in $H_2O$)
0.022 gm.-equivalent of an 80/20 mixture of 2,4- and 2,6-toluene diisocyanates (TDI)

The films were cast on glass plates and cured for one hour at room temperature followed by eight hours at 100° C. in an air circulated oven. After cooling, the films were pulled off the glass plate and tested.

| Property | Original polyether | Vinyl chloride modified polyether |
|---|---|---|
| Modulus at 100% elongation (p.s.i.) | 303 | 787 |
| Elongation at break (percent) | 150 | 160 |
| Tensile strength (p.s.i.) | 330 | 1,254 |
| Tear strength (p.l.i.) | 54 | 98 |

A saturated polypropylene ether succinate was obtained when succinic acid was substituted for maleic acid as the initiator for propylene-oxide polymerization. This glycol, when treated with vinyl chloride and radical initiator in the presence of chain transfer agent under conditions identical to I(B), gave only heterogeneous dispersions of polyvinyl chloride in the glycol.

Polyurethane films were prepared from these dispersions and TDI in a manner identical to the foregoing. The resulting films were extremely weak and brittle.

EXAMPLE II

A maleate polypropylene ether glycol of average molecular weight 1240 (hydroxyl number 90.5 mg. KOH/g.) was prepared using the procedure given in Example I(A).

This polyether glycol (403 g.) was copolymerized with vinyl chloride (60 g.) in the presence of carbontetrachloride (100 ml.) and azo-bisisobutyronitrile (0.6 g.) in a sealed polymerization bottle at 60° C. for 24 hours.

The resulting copolymer was a clear paste containing 44% vinyl chloride.

Moisture-cured films prepared from this glycol and 80/20 toluene-diisocyanate had the following properties:

| Property | Original polyether | Vinyl chloride modified polyether |
| --- | --- | --- |
| Modulus 100% (p.s.i.) | 300 | 2,254 |
| Elongation (percent) | 390 | 150 |
| Tensile (p.s.i.) | 540 | 3,100 |
| Tear (p.l.i.) | 97 | 404 |

EXAMPLE III

The polyether of Example I(A) (100 g.) was copolymerized with methacrylonitrile (20 g.) at 80° C. for 24 hours in the presence of azobisisobutyronitrile and 100 ml. of a 10:90 blend of carbontetrachloride and benzene. The resulting creamy white, viscous material had a hydroxyl number of 57.8 mg. KOH/g. and an acid number of 0.79 mg. KOH/g.

A film prepared from this polyol according to the procedure and recipe given in Example I(C) had modulus (at 300% elong.) of 303 p.s.i., a tensile strength of 1490 p.s.i., an elongation of 183% and a tear strength of 127 p.l.i.

EXAMPLE IV (A)

A polypropylene ether glycol containing one itaconate unit per mole of polyether was prepared as in Example I by reacting itaconic acid (130 g.), propylene oxide (1870 g.) and zinc cobalticyanide (1.0 g.) in tetrahydrofuran (1000 g.) for 12 hours at 50° C. The resulting viscous liquid had a hydroxyl number of 55.8 mg. KOH/g. corresponding to a glycol molecular weight 2000.

(B) COPOLYMERIZATION WITH ACRYLONITRILE 120 grams of the above polyether, 30 g. of acrylonitrile, 0.3 g. azobisisobutyronitrile and 1.5 g. trichlorobromomethane were charged to a polymerization bottle. The bottle was sealed and placed in an 80° C. constant temperature bath for 24 hours.

After removal of volatiles at 70° C. under reduced pressure there remained 140 g. of an orange-colored, clear, viscous liquid which had the following properties:

Brookfield viscosity _____ 25,000 cps.
Hydroxyl number _____ 50.6 mg. KOH/g.; EW 1100.
Molecular weight (VPO) _ 4590.
Functionality _____ 4.1.
Nitrogen _____ 3.78%.

(C) FLEXIBLE URETHANE FOAM PREPARATION AND PROPERTIES

Handmixed, one-shot flexible foams were prepared from blends of the above copolymer-polyol IV(B) with a standard, commercially available polypropylene ether triol having a number average molecular weight of about 3000 (Poly G-3030 PG, Olin Mathieson). Formulations and load-bearing properties of the obtained foam are given in the following table.

FLEXIBLE URETHANE FOAMS PREPARED FROM THE EXPERIMENTAL POLYOL OF EXAMPLE IV AND COMMERCIALLY AVAILABLE POLYOLS

| | A | B | C |
| --- | --- | --- | --- |
| Poly G-3030 PG | 100 | 75 | 50 |
| Copolymer-polyol | | 25 | 50 |
| 80/20 TDI NCO index | 52 | 54 | 54 |
| Activator I* | 4.6 | 4.6 | 4.6 |
| Stannous octoate | Level varied to balance foam formulation. | | |
| Silicone surfactant | 1.0 | 1.0 | 1.0 |
| Diglycidyl ether of bisphenol A (Epon 828) | | 2 | 4 |
| Density p.c.f. | 1.55 | 1.65 | 1.67 |
| Compression load—4×4×2″ sample deflection: | | | |
| 25% | 6.8 | 9.1 | 11.2 |
| 65% | 12.9 | 18.5 | 23.9 |
| Load factor | 1.89 | 2.03 | 2.13 |

*Tetramethylbutane diamine (0.05 g), N-methyl morpholine (0.6 g.), water (4.0 g).

EXAMPLE V

A polyether containing an average of one maleate unit per molecule was prepared by esterification of polypropylene ether glycol of an average molecular weight 425 (2 moles) with maleic anhydride (1 mole). The resulting diol (80 gm.) was copolymerized with vinyl chloride (20 gm.) in the presence of 200 ml. of $CCl_4$ as chain transfer agent. Only partially crosslinked, soft gels were obtained. This example shows that a conventional thermal polycondensation technique does not yield satisfactory starting materials (macromonomers) useful within the scope of this invention.

EXAMPLE VI

Eighty grams of polypropylene ether glycol of average molecular weight $M_n$—1910; hydroxyl number 58.6 mg. KOH/g.; viscosity 1500 cps. at 20° C. containing one itaconate unit per polyether molecule and prepared under the conditions and with the catalyst system described in Example IV(A) was copolymerized with 20 grams of acrylonitrile at 50° C. for 24 hours in the presence of triethylamine (1.06 g.) as chain transfer agent (initiator 0.2 g. azo-bisisobutyronitrile).

After addition of antioxidant (0.1 g. di-2,6-tertiary butylphenol) and removal of volatile material there was obtained 90 g. of a viscous (29,000 cps. at 20° C.) homogeneous yellow liquid with the following properties:

OH No. _____ 51.3 mg. KOH/g.
Acid No. _____ 0.13 mg. KOH/g.
Percent N _____ 3.21.
Acrylonitrile content ____ 12.2% (calculated from N).
$M_n$ (VPO) _____ 3200.
Average functionality ____ 2.9 (calculated).

Moisture-cured polyurethane films were made from this polyol with TDI and compared with films made in an identical fashion from the starting itaconate-polypropylene ether glycol and a commercially available polypropylene ether glycol of $M_n$ 3000 (Poly G-3030 PG, Olin Mathieson).

The comparative results are as follows:

| Polyol | Poly G-3030 PG | Itaconate PPG | Itaconate PPG-AN copolymer |
| --- | --- | --- | --- |
| OH No. | 56 | 58.6 | 51.3 |
| $M_n$ | [1] 3,000 | [1] 1,910 | [2] 3,200 |
| Functionality | 2.7 | 2 | 2.9 |
| NCO/OH ratio | 2 | 2 | 2 |
| Modulus at 50% elongation (p.s.i.) | 343 | 490 | 900 |
| Tensile strength at break (p.s.i.) | 570 | 790 | 1,250 |
| Linear swell in toluene after 24 hours immersion | 45 | 40 | 27 |

[1] End groups.
[2] VPO.

EXAMPLE VII (A) Propylene oxide was polymerized in the presence of itaconic acid and $Zn_3(Co(CN)_6)_2$ as described in Example I. The obtained glycol had a hydroxyl number of 76 mg. KOH/g. corresponding to an average molecular weight of 1470.

(B) Forty grams of this polypropylene ether itaconate were copolymerized with 60 g. of styrene in 100 ml. carbontetrachloride using 0.6 g. of azo-bisisobutyronitrile as initiator for 24 hours at 60° C. Removal of the solvent in vacuo gave a low melting soft solid with a hydroxyl number of 32.8 mg. KOH/g.

(C) Moisture-cured polyurethane films were made from the original polypropylene ether itaconate 7(A) as well as the styrene-modified polyol VII(B) and TDI (NCO/OH=2.2) and tested. The following properties resulted:

| Polyol | Itaconate 7(A) | Styrene modified itaconate 7(B) |
|---|---|---|
| Modulus 100% (p.s.i.) | 270 | 2,500 |
| Tensile (p.s.i.) | 1,060 | 2,900 |
| Elongation (percent) | 900 | 135 |
| Tear (Graves) (p.l.i.) | 140 | 347 |

A film made from a physical blend of polystyrene of similar molecular weight with polypropylene ether itaconate and TDI under the same conditions gave a very weak, heterogeneous film.

EXAMPLE VIII

The polypropylene ether itaconate prepared in the Example VII (40 g.) was copolymerized with 60 g. of methylmethacrylate in 100 ml. of benzene using 0.6 g. azobisisobutyronitrile as the initiator.

After 24 hours at 60° C. a clear, semi-solid was obtained which was soluble in toluene and had a hydroxyl number of 29.7 mg. KOH/g.

A moisture-cured polyurethane film made from this polyol (one equivalent) and TDI (two equivalents) had tensile strength 3500 p.s.i.; elongation 50%; Graves tear 497 p.l.i., and a yield point at 4500 p.s.i.

We claim:
1. A process for the preparation of a polyurethane which comprises
    (1) chemically reacting
        (A) an organic polyisocyanate and
        (B) a copolymer selected from the class consisting of
            a copolymer of a lower alkyl acrylate or methacrylate with a polyalkylene ether itaconate having an equivalent weight of about 100 to 3000 per hydroxyl groups and containing one to three hydroxyl groups per molecule;
            a copolymer of styrene with a polyalkylene ether itaconate having an equivalent weight of about 100 to 3000 per hydroxyl group containing one to three hydroxyl groups per molecule; and
            a coploymer of a vinyl compound selected from vinyl chloride, vinylidene chloride and vinyl acetate with a polyalkylene ether maleate having an equivalent weight of about 100 to 3000 per hydroxyl group and containing one to three hydroxyl groups per molecule; and
    (2) recovering a polyurethane of improved physical and chemical properties including increased tensile strength, increased modulus of elasticity and increased solvent resistance.

2. A polyurethane prepared in accordance with claim 1.

3. A process in accordance with claim 1 wherein components (A) and (B) are reacted in contact with water and at least an equivalent amount of organic polyisocyanate (A) to produce a foam of increased load supporting capacity.

4. A polyurethane foam prepared in accordance with claim 3.

References Cited

UNITED STATES PATENTS

| | | | |
|---|---|---|---|
| 3,755,271 | 8/1973 | Montgomery | 260—859 PV |
| 3,746,663 | 7/1973 | Beale | 260—2.5 BE |
| 3,741,943 | 6/1973 | Sekmakas | 260—77.5 CR |
| 3,657,384 | 4/1972 | Yoshida | 260—78.5 B |
| 3,625,926 | 12/1971 | Dowbenko | 260—78.5 B |
| 3,481,973 | 12/1969 | Wygant | 260—78.5 B |
| 3,453,345 | 7/1969 | Mabrey | 260—78.5 B |
| 3,406,221 | 10/1968 | Wright | 260—78.5 B |
| 3,402,153 | 9/1968 | Jaeger | 260—78.5 B |
| 3,392,137 | 7/1968 | Slocombe | 260—78.5 CL |
| 3,356,637 | 12/1967 | Slocombe | 260—78.5 CL |
| 3,652,639 | 3/1972 | Pizzini | 260—859 R |
| 3,729,370 | 4/1973 | Cobbledick | 260—2.5 BB |
| 3,383,351 | 5/1968 | Stamberger | 260—2.5 BE |
| 3,304,273 | 2/1967 | Stamberger | 260—2.5 BE |
| 3,328,468 | 6/1967 | Nowak | 260—2.5 AP |

FOREIGN PATENTS

| | | | |
|---|---|---|---|
| 1,040,452 | 8/1966 | Great Britain | 260—2.5 BE |
| 1,210,555 | 2/1966 | Germany | 260—2.5 BE |

DONALD E. CZAJA, Primary Examiner

C. W. IVY, Assistant Examiner

U.S. Cl. X.R.

260—2.5 AP, 77.5 NP, 77.5 CR, 78.5 B, 78.5 CL, 78.5 HC, 859 R, 859 PV

PO-1050
(5/69)

UNITED STATES PATENT OFFICE
CERTIFICATE OF CORRECTION

Patent No. 3,850,861        Dated November 26, 1974

Inventor(s) Hubert J. Fabris, Robert J. Herold & Edwin M. Maxey

It is certified that error appears in the above-identified patent and that said Letters Patent are hereby corrected as shown below:

Column 2, line 20, after "weight" add ---per hydroxyl group---.

Column 2, line 21, delete "per hydroxyl group".

Column 2, line 71, which reads: "dicarboxyic" should read ---dicarboxylic---.

Column 4, line 26, which reads: "polyethylene glycol" should read ---polyether glycol---.

Column 4, line 36, which reads: "azo-bisiobutyronitrile" should read ---azo-bisisobutyronitrile---.

Column 4, line 49, which reads: "0.01 gm.-equivalent polyetherpolyol based on hydroxyl" should read ---0.01 gm.-equivalent 1,2,4-butanetriol based on hydroxyl---.

Column 5, line 74, which reads: "foam" should read ---foams---.

Column 6, lines 32, 48, 55 and 62, which reads: "$M_n$" should read --- $\bar{M}_n$ ---.

Column 8, line 1, before "containing" add ---and---.

Signed and Sealed this second Day of September 1975

[SEAL]

Attest:

RUTH C. MASON
Attesting Officer

C. MARSHALL DANN
Commissioner of Patents and Trademarks